US012027136B2

(12) United States Patent
Nam et al.

(10) Patent No.: US 12,027,136 B2
(45) Date of Patent: Jul. 2, 2024

(54) DATA TRANSMISSION METHOD, TIMING CONTROLLER, AND STORAGE MEDIUM

(71) Applicants: Beijing ESWIN Computing Technology Co., Ltd., Beijing (CN); Hefei ESWIN Computing Technology Co., Ltd., Hefei (CN)

(72) Inventors: Jangjin Nam, Beijing (CN); Dongmyung Lee, Beijing (CN); Donghoon Baek, Beijing (CN); Daejoon Lee, Beijing (CN)

(73) Assignees: Beijing ESWIN Computing Technology Co., Ltd., Beijing (CN); Hefei ESWIN Computing Technology Co., Ltd., Hefei (CN)

( * ) Notice: Subject to any disclaimer, the term of this patent is extended or adjusted under 35 U.S.C. 154(b) by 0 days.

(21) Appl. No.: 18/147,219

(22) Filed: Dec. 28, 2022

(65) Prior Publication Data

US 2023/0386427 A1 Nov. 30, 2023

(30) Foreign Application Priority Data

May 30, 2022 (CN) ......................... 202210603024.0

(51) Int. Cl.
*G09G 5/00* (2006.01)

(52) U.S. Cl.
CPC ......... *G09G 5/003* (2013.01); *G09G 2370/04* (2013.01)

(58) Field of Classification Search
None
See application file for complete search history.

(56) References Cited

U.S. PATENT DOCUMENTS

2012/0185717 A1 7/2012 Song et al.
2012/0242628 A1 9/2012 Yuan et al.
(Continued)

FOREIGN PATENT DOCUMENTS

CN 101483908 A 7/2009
CN 107369415 A 11/2017
(Continued)

OTHER PUBLICATIONS

China National Intellectual Property Administration, First Office Action in Patent Application No. CN202210603024.0 dated Aug. 24, 2023, which is a foreign counterpart application corresponding to this U.S. Patent Application, to which this application claims priority.

(Continued)

*Primary Examiner* — Stephen T. Reed
(74) *Attorney, Agent, or Firm* — Kolitch Romano Dascenzo Gates LLC

(57) ABSTRACT

Provided is a data transmission method, including: sending clock calibration data to a source driver chip, wherein the clock calibration data instructs the source driver chip to perform clock calibration; sending first configuration information to the source driver chip over a data channel in response to completing the clock calibration by the source driver chip, wherein the first configuration information instructs the source driver chip to perform a configuration on a physical layer parameter; and successively sending a link stable pattern and display data to the source driver chip.

20 Claims, 2 Drawing Sheets

(56) References Cited

U.S. PATENT DOCUMENTS

| | | | | |
|---|---|---|---|---|
| 2013/0205155 | A1 | 8/2013 | Yang et al. | |
| 2015/0131543 | A1 | 5/2015 | Huo et al. | |
| 2015/0187315 | A1 | 7/2015 | Park | |
| 2016/0125840 | A1 | 5/2016 | Oh et al. | |
| 2016/0284313 | A1 | 9/2016 | Lin et al. | |
| 2017/0069257 | A1 | 3/2017 | Lee et al. | |
| 2018/0061365 | A1 | 3/2018 | Lee et al. | |
| 2018/0357946 | A1 | 12/2018 | Ryu et al. | |
| 2019/0341000 | A1 | 11/2019 | Tseng et al. | |
| 2020/0090616 | A1 | 3/2020 | Duan et al. | |
| 2020/0090618 | A1 | 3/2020 | Guo et al. | |
| 2020/0118518 | A1 | 4/2020 | Chu et al. | |
| 2020/0126507 | A1 | 4/2020 | Guo et al. | |
| 2020/0135081 | A1 | 4/2020 | Duan et al. | |
| 2020/0143721 | A1 | 5/2020 | Chu et al. | |
| 2020/0310827 | A1 * | 10/2020 | Duan .................... | G06F 9/4411 |
| 2021/0193002 | A1 | 6/2021 | Kim et al. | |
| 2021/0193004 | A1 | 6/2021 | Kim et al. | |
| 2021/0193005 | A1 | 6/2021 | Kim et al. | |
| 2021/0335291 | A1 | 10/2021 | Duan et al. | |
| 2022/0114944 | A1 | 4/2022 | Duan et al. | |
| 2022/0189389 | A1 | 6/2022 | Lee et al. | |
| 2023/0179394 | A1 | 6/2023 | Kim et al. | |
| 2023/0215332 | A1 | 7/2023 | Cheng | |

FOREIGN PATENT DOCUMENTS

| | | | |
|---|---|---|---|
| CN | 108694917 | A | 10/2018 |
| CN | 109036300 | A | 12/2018 |
| CN | 111477158 | A | 7/2020 |
| WO | 2019104947 | A1 | 6/2019 |

OTHER PUBLICATIONS

China National Intellectual Property Administration, Second Office Action in Patent Application No. CN202210603024.0 dated Oct. 25, 2023, which is a foreign counterpart application corresponding to this U.S. Patent Application, to which this application claims priority.

China National Intellectual Property Administration, Notification to grant patent right for invention of Chinese application No. 202210603024.0 issued on Mar. 27, 2024, which is foreign counterpart application of this US application.

* cited by examiner

DATA TRANSMISSION METHOD, TIMING CONTROLLER, AND STORAGE MEDIUM

CROSS-REFERENCE TO RELATED APPLICATION

This application is based on and claims priority to Chinese Patent Application No. 202210603024.0, filed on May 30, 2022, and entitled "METHOD AND APPARATUS FOR TRANSMITTING DATA, TIMING CONTROLLER, AND STORAGE MEDIUM", the disclosure of which is herein incorporated by reference in its entirety.

TECHNICAL FIELD

The present disclosure relates to the technical field of displays, and in particular, relates to a data transmission method, a timing controller, and a storage medium.

BACKGROUND

Generally, a display apparatus includes a display panel and a drive circuit for driving the display panel. The drive circuit includes a timing controller (TCON) and a source driver (SD) chip. Data is transmitted between the TCON and the SD chip according to a point-to-point (P2P) protocol.

SUMMARY

Embodiments of the present disclosure provide a data transmission method, a timing controller, and a storage medium. The technical solutions are as follows.

According to some embodiments of the present application, a data transmission method is provided. The method is applied in a TCON, and the method includes:

- sending clock calibration data to a source driver chip, wherein the clock calibration data instructs the source driver chip to perform clock calibration;
- sending, in response to completing the clock calibration by the source driver chip, first configuration information to the source driver chip over a data channel, wherein the first configuration information instructs the source driver chip to perform a configuration on a physical layer parameter; and
- successively sending a link stable pattern and display data to the source driver chip.

In some embodiments, the first configuration information includes at least one of drive current configuration information, equalizer gain configuration information, and clock data recovery loop bandwidth configuration information of the source driver chip.

In some embodiments, after successively sending the link stable pattern and the display data to the source driver chip, the method further including:

- re-sending, in response to a lock loss of the source driver clip, the clock calibration data to the source driver chip; and
- sending, in response to re-completing the clock calibration by the source driver chip, second configuration information to the source driver chip over the data channel, wherein the second configuration information instructs the source driver chip to re-perform the configuration on the physical layer parameter.

In some embodiments, the display data includes any row of pixel data in a frame of data, the row of pixel data corresponding to a row control instruction; and

- the row control instruction includes first power indication information, the first power indication information indicating whether the timing controller and the source driver chip enter a low-power mode in a horizontal blank period.

In some embodiments, the display data includes a last row of pixel data in a frame of data, the last row of pixel data corresponding to a frame control instruction; and

- the frame control instruction includes second power indication information, the second power indication information indicating whether the timing controller and the source driver chip enter a low-power mode in a vertical blank period.

In some embodiments, there is a plurality of data channels; wherein sending the first configuration information to the source driver chip over the data channel includes:

- sending the first configuration information to the source driver chip over each of the plurality of data channels, wherein the first configuration information sent over each data channel instructs the source driver chip to perform the configuration on the physical layer parameter corresponding to the data channel.

In some embodiments, the first configuration information is different over at least two of the plurality of data channels.

According to some embodiments of the present application, a timing controller is provided. The timing controller includes:

- a processor, a transceiver, and a memory, wherein the memory stores one or more instructions executable by the processor; and
- the processor, when loading and running the one or more instructions, is caused to control the transceiver to perform the data transmission method as described above.

According to some embodiments of the present application, a non-transitory computer-readable storage medium storing one or more computer programs is provided. The one or more computer programs, when loaded and executed by a computer, cause the computer to perform the data transmission method as described above.

According to some embodiments of the present application, a computer program product including one or more instructions is provided. The one or more instructions, when loaded and run by a computer, cause the computer to perform the data transmission method as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure is described in further detail with reference to the enclosed drawings, to clearly present the objects, technical solutions, and advantages of the present disclosure.

Prior to the detailed description of the data transmission method according to the embodiments of the present disclosure, implementation environments involved in the embodiments of the present disclosure are described hereinafter first.

A display apparatus generally includes a display panel and a drive circuit for driving the display panel. The display apparatus may be a liquid crystal display apparatus or other types of display apparatus. A data transmission method according to some embodiments of the present disclosure is mainly applied in the drive circuit of the display apparatus.

Figure 1:
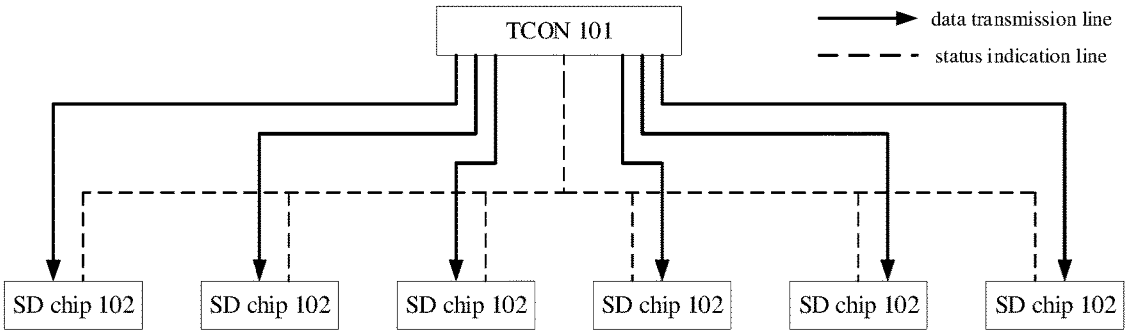
FIG. 1 is a system architecture diagram involved in a data transmission method according to some embodiments of the present disclosure.

Referring to FIG. 1, the drive circuit includes a timing controller TCON 101 and a plurality of source driver SD chips 102. Each of the SD chips 102 is configured to drive a display region of the display panel to display images. The plurality of SD chips 102 are capable of driving a whole display region of the display panel to display the images. The TCON 101 establishes a communication connection and interacts data with each of the SD chips 102 over a P2P protocol. For example, the P2P protocol is a clock-embedded high-speed point-to-point interface (CHPI) protocol.

It should be noted that referring to FIG. 1, the TCON 101 is connected to each of the SD chips 102 over a data transmission line, and the data transmission line is a data channel for transmitting the data between the TCON 101 and the SD chip 102. In addition, the TCON 101 is connected to each of SD chips over a status indication line. A signal transmitted in the data transmission line is a unidirectional transmission signal, and the unidirectional transmission signal is transmitted from the TCON 101 to the SD chip 102. The status indication line indicates whether the SD chip 102 needs to perform clock calibration, that is, indicating whether the SD chip 102 is lock loss.

In the related art, the timing controller sends clock calibration data to the source driver chip over the data transmission line in the case that the source driver chip is determined to be required to perform the clock calibration based on the status indication line. In the case that each of the source driver chip completes the clock calibration based on the clock calibration data sent by the timing controller, the timing controller successively sends a link stable pattern (LSP) and display data to the source driver chip.

Therefore, in the related art, the timing controller cannot perform a configuration on a physical layer parameter of the source driver chip prior to sending the LSP and the display data to the source driver chip, and thus the performance of receiving data by the source driver chip cannot be optimized. As a result, the LSP and display data received by the source driver chip may be unstable. For example, the error rate of the received data may be high or even the data may be lost, thereby adversely affecting the image display quality.

The embodiments of the present disclosure provide a data transmission method, which is used to implement a configuration of the physical layer parameter of the SD chip 102 by the TCON 101. In some embodiments, after the SD chip 102 completes the clock calibration, the TCON 101 sends configuration information to the SD chip 102 over the data transmission line to perform the configuration on the physical layer parameter of the SD chip 102. In this way, the SD chip 102 is capable of configuring itself based on the configuration information sent by the TCON 101, and thus the receiving performance is optimized, such that receiving qualities of the subsequent LSP and display data are improved, thereby improving the image display quality.

The data transmission method according to some embodiments of the present disclosure is described hereinafter.

Figure 2:
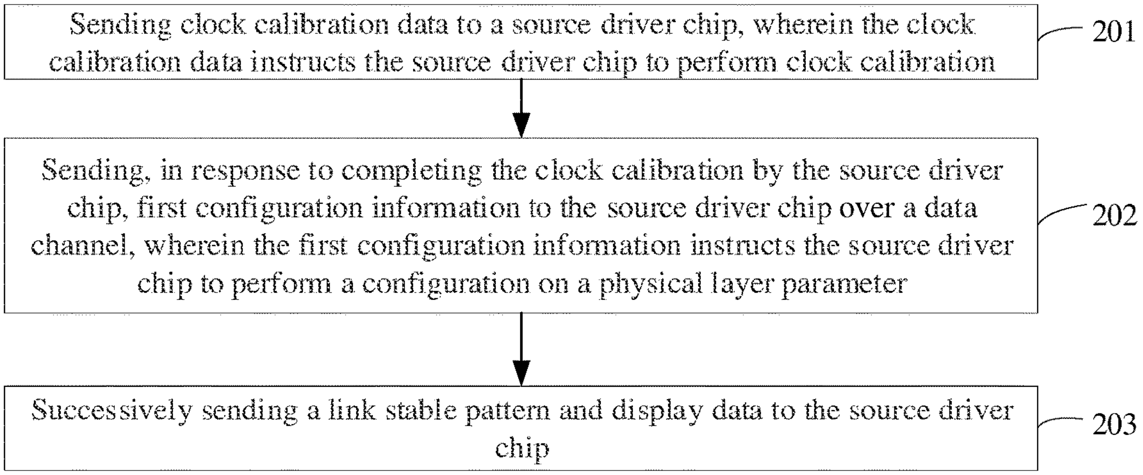
FIG. 2 is a flowchart of a data transmission method according to some embodiments of the present disclosure.

FIG. 2 is a flowchart of a data transmission method according to some embodiments of the present disclosure. The method is applied in the TCON of the aforementioned display apparatus. Referring to FIG. 2, the method includes the following steps.

In step 201, clock calibration data is sent to a source driver (SD) chip.

In some embodiments of the present disclosure, a status indication line is connected between the TCON and each of the SD chips. In the case that the TCON and the SD chip are power-on or reset, the TCON determines, by detecting a level state of the status indication line, whether the SD chip needs to perform clock calibration. Upon determining that the SD chip needs to perform the clock calibration, the TCON sends the clock calibration data to each of the SD chips over a data transmission line. Upon receiving the clock calibration data sent by the TCON, each of the SD chips restores a data clock from the clock calibration data to acquire the clock signal synchronized with the TCON.

In some embodiments, the status indication line is a single-ended signal line for indicating whether the SD chip is a lock loss. For example, the status indication line is the single-ended signal line from the SD chip to the TCON. In the case the TCON and the SD chip are power-on or reset, the status indication line is in the first level state by default. Upon detecting that the status indication line is in the first level state, the TCON sends the clock calibration data to each of the SD chips over the data transmission lines. The first level state indicates the lock loss, and the first level state is a high level or a low level, which is not limited herein.

Any of the SD chips is taken as an example. The data transmission line between the TCON and the SD chip includes at least one pair of differential signal lines. Each pair of differential signal lines is a data channel for transmitting a pair of differential signals. The TCON sends the clock calibration data to the SD chip over each of the data channels between the TCON and the SD chip, or sends the clock calibration data to the SD chip over one of the data channels between the TCON and the SD chip, which is not limited herein.

The above clock calibration data is a clock data recovery (CDR) sequence, and the SD chip includes a CDR circuit. Upon receiving the CDR sequence, the CDR circuit in the SD chip restores the clock signal synchronized with the TCON from the CDR sequence.

In step 202, first configuration information is sent to the source driver chip over the data channel in response to completing the clock calibration by the source driver chip. The first configuration information instructs the source driver chip to perform a configuration on a physical layer parameter.

After completing the clock calibration, that is, upon the successful clock calibration, each of the SD chips controls the status indication line connected to itself to switch from the first level state to a second level state. In a case where the TCON detects that the status indication line is in the second level state, it is determined that each of the SD chips has completed the clock calibration. In this case, the TCON sends the first configuration information over the data transmission line between the TCON and the SD chip.

The second level state is different from the first level state. For example, in the case that the first level state is a high level, then the second level state is a low level; and in the case that the first level state is a low level, then the second level state is a high level Any of the SD chips is taken as an example. As described above, at least one pair of differential signal lines is connected between the TCON and the SD chip, and one pair of the differential signal lines is one of the data channels. The TCON sends the first configuration information to the SD chip over each pair of differential signal lines between the TCON and the SD chip. That is, the TCON sends the first configuration information to the SD chip over each of the data channels between the TCON and the SD chip.

The first configuration information transmitted over each of the data channels instructs the SD chip to perform the configuration on the physical layer parameter corresponding to the data channel. That is, the first configuration information transmitted over one of the data channels instructs the SD chip to configure the physical layer parameter corresponding to the one of the data channels.

In some embodiments, the first configuration information transmitted over each of the data channels is identical. In this case, the configurations of the SD chip for the physical layer parameters of each of the data channels are identical.

In some embodiments, in the case that the TCON wants to control the configurations of each of the physical layer parameters of the data channels to be identical, the TCON sends the first configuration information over one of the data channels between the TCON and the SD chip, instead of sending the identical configuration information over each of the data channels.

In some embodiments, the first configuration information as sent is different over at least two of the data channels. In this case, the configurations of the physical layer parameters of different data channels are different. Because transmission performance of the different data channels may be different, the configurations on the physical layer parameters of the different data channels performed by using the different configuration information are beneficial for the SD chip to optimize the receiving performance for the data transmitted over the corresponding data channel.

The first configuration information includes at least one of drive current configuration information of the SD chip, equalizer (EQ) gain configuration information, and CDR loop bandwidth configuration information.

The drive current configuration information is configured to set the drive current of the SD chip. The drive current is a drive current of a high-speed receiver in the SD chip. The drive current of the SD chip is positively correlated with a data transmission rate. Therefore, the data transmission rate is better matched by configuring the drive current of the SD chip, thereby ensuring the stability of the data transmission.

In some embodiments, the drive current configuration information is instruction information of a current level. For example, the drive current configuration information is any one of a normal mode, a current gear 1, a current gear 2, and a current gear 3. The normal mode is configured to instruct the SD chip to set the drive current as a default current value. The current gears 1 to 3 are configured to instruct the SD chip to set the drive current to be a current value of the corresponding current gear. The current value of each of the current gears is preset in the SD chip.

The EQ gain configuration information is configured to set an EQ equalization gain of the SD chip. The EQ is a component for calibrating an amplitude frequency characteristic and a phase frequency characteristic of the data channel. That is, the EQ performs amplitude, frequency, and phase compensation of the signal received by the SD chip to reduce the error rate of the received data. By configuring the appropriate EQ equalization gain for the SD chip, the EQ is capable of performing signal compensation better, such that the accuracy of the data transmission is improved. In some embodiments, the gain configuration information of the EQ includes an EQ equalization peak gain and an EQ equalization direct-current gain of the data channel.

The CDR loop bandwidth configuration information is configured to set a CDR loop bandwidth of the SD chip. The CDR loop bandwidth is the loop bandwidth of the CDR circuit in the SD chip. The CDR circuit includes a phase locking loop (PLL), and the PLL is configured to lock a frequency and phase of the clock signal. In this case, the CDR loop bandwidth is the loop bandwidth of the PLL. The loop bandwidth of the PLL is a noise bandwidth of a narrow-band tracking filter equivalent to a PLL loop for characterizing an effect on suppressing the noise by the PLL loop. The ability of the PLL loop to suppress the noise affects the lock of the PLL, that is, affects the clock calibration of the SD chip. In some embodiments, the CDR loop bandwidth configuration information includes a CDR loop bandwidth value.

In some embodiments, the first configuration information includes terminal resistor configuration information and transmission rate configuration information. For any pair of differential signal lines connected between the TCON and the SD chip, the SD chip includes a terminal resistor corresponding to the pair of differential signal lines. The terminal resistor is connected between the pair of differential signal lines for impedance matching to improve the quality of the transmitted signal. The terminal resistor configuration information is configured to set the magnitude of the terminal resistor connected between each pair of differential signal lines connected to the SD chip. The transmission rate configuration information is configured to configure the data transmission rate of the data channel between the TCON and the SD chip.

In step 203: a link stable pattern (LSP) and display data are successively sent to the SD chip.

Upon sending the first configuration information to the SD chip, the TCON sends the LSP to the SD chip over the data transmission line.

In some embodiments, any of the SD chips is taken as an example. The TCON sends the LSP to the SD chip over each pair of differential signal lines between the TCON and the SD chip. That is, the LSP is transmitted over each pair of differential signal lines. Upon receiving the LSP, the SD chip performs phase deviation calibration and scrambling reset based on the LSP to prepare for the subsequent reception of the display data.

Figure 3:
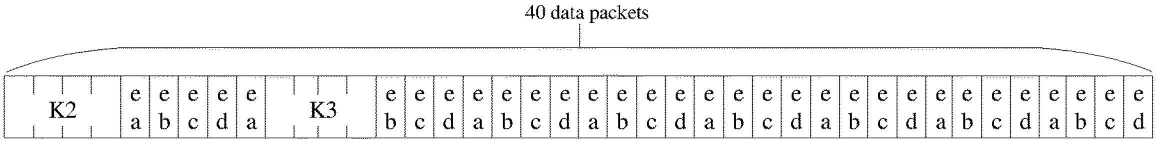
FIG. 3 is a schematic diagram of a data structure of an LSP according to some embodiments of the present disclosure.

The LSP is a specific sequence, and the LSP includes two identification codes and eight data units. Referring to FIG. 3, the two identification codes are respectively a K2 code and a K3 code. Each of the eight data units includes four successive data packets. In some embodiments, the four successive data packets are respectively 0xea, 0xeb, 0xec, and 0xed. The LSP uses the K2 code as a start, then is immediately followed by at least one of the data units, and the K3 code is inserted between any two of the data packets following the at least one of the data units, so as to instruct the reset of a scrambling function. The data packets in the LSP except for the K codes are encoded in an 8B/10B coding mode.

It should be noted that the TCON transmits the LSP to the SD chip at least five times and lasts for more than one microsecond.

Upon sending the LSP to the SD chip, the TCON sends the display data to the SD chip.

As described above, each of the SD chips in the drive circuit is configured to drive one display region of the display panel to display images. On this basis, the TCON acquires a plurality of rows of pixel data of the display region corresponding to the SD chip in a piece of frame data to be displayed currently, and sends the display data to the SD chip based on the plurality of rows of pixel data. The display data includes any row of pixel data in the plurality of rows of pixel data. The frame data to be displayed currently is either video frame data in a video stream or static image frame data.

In some embodiments, the pixel data between the TCON and the SD chip is transmitted frame by frame, and each frame data is transmitted row by row. In some embodiments of the present disclosure, a row of pixel data corresponds to a row control instruction, and the row of pixel data is transmitted immediately following transmission of the row control instruction. The row control instruction is configured to identify a frame initialization polarity control signal, a flip mode, a low-power mode, and a loading signal time sequence of the SD chip. A first identification code is transmitted prior to transmitting the row control instruction, and the first identification code is configured to identify the start of transmission of a row of pixel data. For example, the first identification code is a K1 code. A second identification code is transmitted upon transmitting the row of pixel data, the second identification code is configured to identify an end of the transmission of the row of pixel data and a start of a horizontal blank period (HBP). For example, the second identification code is the K2 code. The horizontal blank period indicates an interval between the end of transmission of the row of pixel data and the start of transmission of the next row of pixel data. Idle data with a constant length is transmitted upon the second identification code.

In some embodiments of the present disclosure, the row control instruction further includes first power indication information. The first power indication information is used to indicate whether to enter the low-power mode during the horizontal blank period.

In some embodiments, in the case that the first power indication information in the row control instruction is a first value, the first power indication information indicates that the TCON enters the low-power mode in the horizontal blank period, wherein the first value is either 0 or 1. In this way, upon transmitting the idle data after the second identification code, the TCON controls a pair of differential signal lines transmitting the row of pixel data to be at a low level, and thus the TCON enters the low-power mode.

Upon receiving the row control instruction, based on the first power indication information, the SD chip is informed that it enters the low-power mode in the horizontal blank period. In this way, in the case that the SD chip detects that the pair of differential signal lines transmitting the row of pixel data is at the low level, the SD chip enters the low-power mode. Meanwhile, the data transmission is stopped over the pair of differential signal lines.

During the horizontal blank period, after the TCON and the SD chip enter the low-power mode, the TCON enters from the low-power mode to a low-power awakening mode prior to transmitting the next row of pixel data. The low-power awakening mode is a transition state for re-entering a data transmission state from the low-power mode. In the low-power awakening mode, the TCON awakens the SD chip by sending the clock calibration data, the configuration information, and the LSP to the SD chip, such that the SD chip recovers to a normal operation state to transmit the next row of pixel data.

It should be noted that the duration of the horizontal blank period is constant. As described above, a sum of a transmission duration of the idle data and durations of the TCON and the SD chip in the low-power mode and the low-power awakening mode during the horizontal blank period is the duration of the horizontal blank period. The transmission duration of the idle data is constant, and therefore, during the horizontal blank period, the shorter the duration that the TCON and the SD chip are in the low-power awakening mode, the longer the duration that the TCON and the SD chip are in the low-power mode, and then the more efficient the power saving. Because the clock calibration is required to be re-performed in the low-power awakening mode, the TCON reduces the duration of the clock calibration in the low-power awakening mode by reducing the number of the transmitted clock calibration data.

In some embodiments, a second value is stored in the TCON. The second value is the number of the clock calibration data to be sent during the horizontal blank period, and the second value is determined based on the duration of the horizontal blank period. After the TCON enters the low-power mode in the horizontal blank period, the duration required to transmit the second value of the clock calibration data is determined according to the duration required to transmit each of the clock calibration data, and a time point for entering the low-power awakening mode during the horizontal blank period is determined based on the duration required to transmit the second value of the clock calibration data, and then the TCON enters the low-power awakening mode at the time point. Upon entering the low-power awakening mode, the TCON sends the second value of the clock calibration data to the SD chip, wherein the second value is less than 48.

After the SD chip re-performs the clock calibration based on the received clock calibration data, the TCON re-sends the configuration information to the SD chip. The re-sent configuration information is identical to or different from the aforementioned first configuration information, which is not limited herein.

Upon re-sending the configuration information to the SD chip, the TCON re-sends the LSP to the SD chip to perform the phase deviation calibration and scrambling reset operations. Afterwards, the TCON continues to send the display data to the SD chip, i.e., the TCON continues to send the next row of pixel data.

In some embodiments, the last row of pixel data corresponds to a frame control instruction. The frame control instruction is transmitted upon transmitting the last row of pixel data and used for static or dynamic settings of the SD chip. A third identification code is transmitted between the last row of pixel data and the frame control instruction, and the third identification code is configured to instruct a completion of transmission of the last row of pixel data in a frame of data, that is, to instruct a completion of transmission of the frame of data. Meanwhile, the third identification code identifies a start of a vertical blank period (VBP). For example, the third identification code is a K4 code. The vertical blank period indicates an interval between the end of transmission of the frame of data and the start of transmission of the next frame of data. The idle data with the constant length is transmitted upon the frame control instruction.

In some embodiments of the present disclosure, the frame control instruction includes second power indication information. The second power indication information indicates whether the low-power mode is entered during the vertical blank period.

In some embodiments, in the case that the second power indication information in the frame control instruction is the first value, the second power indication information indicates that the TCON enters the low-power mode during the vertical blank period. In this case, upon transmitting the idle data after the frame control instruction, the TCON controls a pair of differential signal lines for transmitting the pixel data to be at a low level, and thus the TCON enters the low-power mode.

Upon detecting the second power indication information in the frame control instruction, the SD chip detects whether the pair of differential signal lines for transmitting the pixel data is at a low level. In the case that the pair of differential signal lines is detected to be at the low level, the SD chip also enters the low-power mode. Meanwhile, the data transmission is stopped over the pair of differential signal lines.

During the vertical blank period, after the TCON and the SD chip enter the low-power mode, prior to transmitting the next frame of data, likewise, the TCON enters from the low-power mode to the low-power awakening mode. In the low-power awakening mode, the TCON awakens the SD chip by re-sending the clock calibration data, the configuration information, and the LSP to the SD chip, such that the SD chip recovers to the normal operation state to transmit the next frame of data.

It should be noted that the duration of the vertical blank period is constant. A sum of the transmission duration of the idle data and durations of the TCON and the SD chip in the low-power mode and the low-power awakening mode during the vertical blank period is the duration of the vertical blank period. The transmission duration of the idle data is constant, and therefore, during the vertical blank period, the shorter the duration that the TCON and the SD chip are in the low-power awakening mode, the longer the duration that the TCON and the SD chip are in the low-power mode, and then the more efficient the power saving. Because the clock calibration is required to be re-performed in the low-power awakening mode, the TCON reduces the duration of the clock calibration in the low-power awakening mode by reducing the number of the transmitted clock calibration data.

In some embodiments, a third value is stored in the TCON. The third value is the number of the clock calibration data to be transmitted during the vertical blank period, and the third value is determined based on the duration of the vertical blank period. After the TCON enters the low-power mode in the vertical blank period, the duration required to transmit the third value of the clock calibration data is determined according to the duration required to transmit each of the clock calibration data, and a time point for entering the low-power awakening mode during the vertical blank period is determined based on the duration required to transmit the third value of the clock calibration data, and then the TCON enters the low-power awakening mode at the time point. Upon entering the low-power awakening mode, the TCON sends the third value of the clock calibration data to the SD chip, wherein the third value is less than 4000.

After the SD chip re-performs the clock calibration based on the received clock calibration data, the TCON re-sends the configuration information to the SD chip. The configuration information is identical to or different from the above first configuration information, or is identical or different from the above configuration information transmitting during the horizontal blank period, which is not limited herein.

Upon re-sending the configuration information to the SD chip, the TCON re-sends the LSP to the SD chip to perform the phase deviation calibration and scrambling reset operations. Afterwards, the TCON continues to send the display data to the SD chip, i.e., the TCON continues to send the first row of pixel data of the next frame of data.

Figure 4:
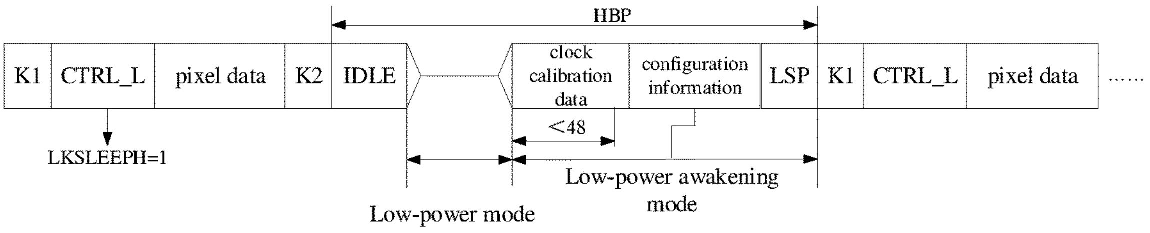
FIG. 4 is a schematic diagram of a process of transmitting a row of pixel data between a TCON and an SD chip according to some embodiments of the present disclosure.

FIG. 4 is a schematic diagram of a process of transmitting a row of pixel data between a TCON and an SD chip according to some embodiments of the present disclosure. The row of pixel data is not the last row of pixel data in the plurality of rows of pixel data corresponding to the SD chip. Referring to FIG. 4, the K1 code is transmitted first, and the K1 code is configured to indicate the start of transmission of a row of pixel data. The row control instruction (CTRL_L) is transmitted upon the K1 code, and the row control instruction carries the first power indication information (LKSLEEPH=1). The first power indication information is 1, and is configured to indicate entering the low-power mode in the horizontal blank period. The row of pixel data is transmitted upon the row control instruction. The K2 code is transmitted upon the row of pixel data, and is configured to indicate an end of the transmission of the row of pixel data and a start of the vertical blank period. The idle (IDLE) data is transmitted upon the K2 code, and then the TCON and the SD chip enter the low-power mode. Afterwards, in the case that the time point to enter the low-power awakening mode arrives, the TCON re-sends the clock calibration data to the SD chip, wherein the amount of the transmitted clock calibration data is less than 48. The SD chip re-performs the clock calibration based on the received clock calibration data. In the case that the SD chip completes the clock calibration, the TCON successively sends the configuration information and the LSP to the SD chip, and re-starts transmission of the next row of pixel data upon transmitting the LSP.

Figure 5:
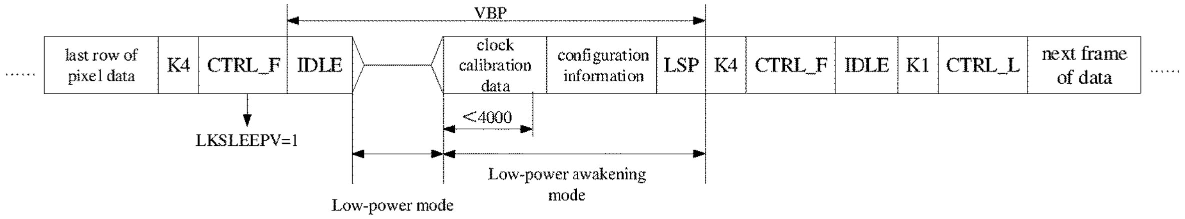
FIG. 5 is a schematic diagram of a process of transmitting the last row of pixel data between a TCON and an SD chip according to some embodiments of the present disclosure.

FIG. 5 is a schematic diagram of another process of transmitting a row of pixel data between a TCON and an SD chip according to some embodiments of the present disclosure. The row of pixel data is the last row of pixel data corresponding to the SD chip in a piece of frame data. The K1 code is transmitted first, and the K1 code is configured to indicate the start of transmission of a row of pixel data. The row control instruction (CTRL_L) is transmitted upon the K1 code. The row of pixel data is transmitted upon the row control instruction. Referring to FIG. 5, the K4 code is transmitted upon the row of pixel data, and is configured to indicate an end of transmission of the last row of pixel data corresponding to the SD chip in the frame of data. The frame control instruction (CTRL_F) is transmitted upon the K4 code, and is configured to indicate the start of the vertical blank period. The idle data is transmitted upon the frame control instruction, and then the TCON and the SD chip enter the low-power mode. Afterwards, in the case that the time point to enter the low-power awakening mode arrives, the TCON re-sends the clock calibration data to the SD chip, wherein the amount of the transmitted clock calibration data is less than 4000. The SD chip re-performs the clock calibration based on the received clock calibration data. In the case that the SD chip completes the clock calibration, the TCON successively sends the configuration information and the LSP to the SD chip, and re-starts transmission of the next frame of pixel data upon transmitting the LSP.

In some embodiments, the SD chip suffers from lock loss issues during receiving data. In this case, the SD chip re-performs the clock calibration. That is, in the case that the SD chip detects the lock loss, the state indication line is controlled to be in the first level state. In the case that the TCON detects that the status indication line is in the first level state, the TCON re-transmits the clock calibration data to the SD chip, such that the SD chip re-performs the clock calibration. After the SD chip completes the clock calibration, the TCON re-sends the second configuration information to the SD chip over the data channel, and the second configuration information is configured to perform a re-configuration on the physical layer parameter of the SD chip. Afterwards, the TCON sends the LSP and the display data to the SD chip. The second configuration information is identical to or different from any of the aforementioned configuration information.

In some embodiments of the present disclosure, after the SD chip completes the clock calibration, prior to sending the LSP and display data to the SD chip, the TCON first sends the configuration information to the SD chip over the data channel, so as to perform the configuration on the physical layer parameter of the SD chip, and thus the receiving performance of the SD chip is optimized, thereby improving the transmission quality of the subsequent data and the image display quality. In addition, in the case that the TCON awakens the SD chip in the horizontal blank period, the TCON sends the clock calibration data, the amount of which is less than 48, to the SD chip. In the case that the TCON awakens the SD chip in the vertical blank period, the TCON sends the clock calibration data, the amount of which is less than 4000, to the SD chip. In this way, the duration of the TCON and the SD chip in the low-power awakening mode is reduced, such that the duration in the low-power mode is prolonged, thereby improving the power saving efficient.

A data transmission apparatus according to some embodiments of the present disclosure is described hereafter.

Figure 6:
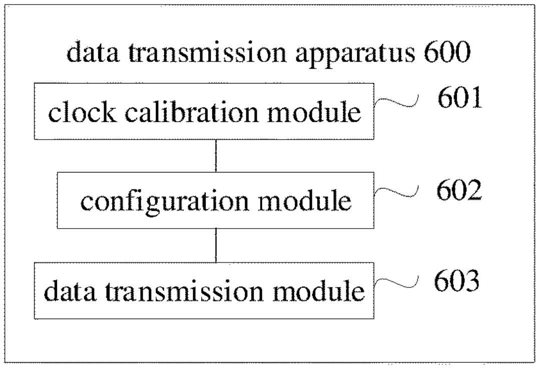
FIG. 6 is a schematic structural diagram of a data transmission apparatus according to some embodiments of the present disclosure.

Referring to FIG. 6, some embodiments of the present disclosure provide a data transmission apparatus 600. The apparatus 600 is applied in the TCON, and the apparatus 600 includes:

- a clock calibration module 601, configured to send clock calibration data to an SD chip, wherein the clock calibration data instructs the SD chip to perform clock calibration;
- a configuration module 602, configured to send first configuration information to the SD chip over a data channel in response to completing the clock calibration by the SD chip, wherein the first configuration information instructs the SD chip to perform a configuration on a physical layer parameter; and
- a data transmission module 603, configured to successively send an LSP and display data to the SD chip.

In some embodiments, the first configuration information includes at least one of drive current configuration information, EQ gain configuration information, and CDR loop bandwidth configuration information of the SD chip.

In some embodiments, the clock calibration module 601 is further configured to re-send the clock calibration data to the SD chip in response to a lock loss of the SD chip; and the configuration module 602 is further configured to send second configuration information to the SD chip over the data channel in response to re-completing the clock calibration by the SD chip, wherein the second configuration information instructs the SD chip to re-perform the configuration on the physical layer parameter.

In some embodiments, the display data includes any row of pixel data in a frame of data, and the row of pixel data corresponds to a row control instructions; wherein the row control instruction includes first power indication information, the first power indication information indicating whether the ICON and the SD chip enter a low-power mode in a horizontal blank period.

In some embodiments, the display data includes the last row of pixel data in a frame of data, and the last row of pixel data corresponds to a frame control instruction; wherein the frame control instruction includes second power indication information, the second power indication information indicates whether the TCON and the SD chip enter a low-power mode in a vertical blank period.

In some embodiments, there are a plurality of data channels; and the configuration module 602 is mainly configured to:

sending the first configuration information to the SD chip over each of the plurality of data channels, wherein the first configuration information sent over each data channel instructs the SD chip to perform the configuration on the physical layer parameter corresponding to the data channel.

In some embodiments, the first configuration information is different over at least two of the plurality of data channels.

In summary, in some embodiments of the present disclosure, in the case that the SD chip completes the clock calibration, prior to sending the LSP and display data to the SD chip, the TCON first sends the configuration information to the SD chip over the data channel to perform the configuration on the physical layer parameter of the SD chip, and thus the receiving performance of the SD chip is optimized. In this way, the transmission quality of the subsequent data is improved, thereby improving the image display quality.

It should be noted that the division of respective functional modules is taken as an example for illustrating the data transmission apparatus provided by the foregoing embodiments. In practical applications, the functions may be distributed to different functional modules according to needs. That is, the internal structure of the device is divided into different functional modules to complete all of or a part of the functions described above. In addition, the embodiments of the data transmission apparatus belong to the same concept with the embodiments of the data transmission method provided in the foregoing embodiments. A reference is made to the method embodiments for the specific implementation process, which will not be repeated herein.

Figure 7:
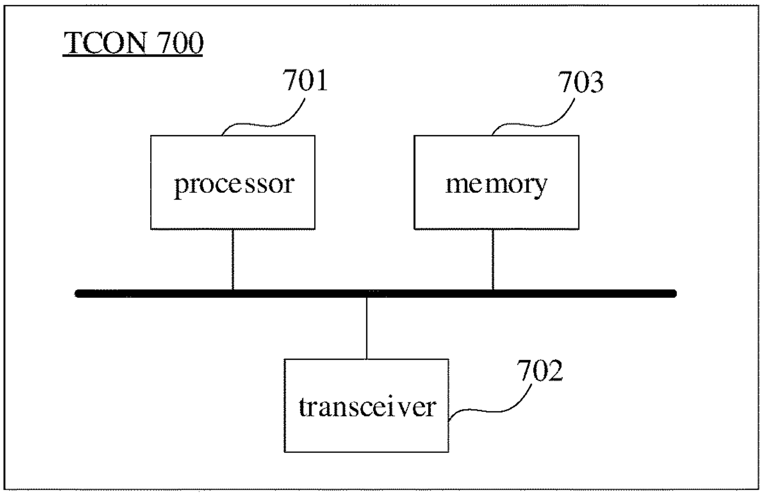
FIG. 7 is a schematic structural diagram of a TCON according to some embodiments of the present disclosure.

FIG. 7 is a schematic structural diagram of a TCON 700 according to some embodiments of the present disclosure. Referring to FIG. 7, the TCON 700 includes a processor 701, a transceiver 702, and a memory 703.

The processor 701 is implemented by using at least one hardware form of the digital signal processing (DSP), filed-programmable gate array (FPGA), programmable logic array (PLA).

The transceiver 702 is configured to receive or transmit a signal.

The memory 703 includes one or more computer-readable storage mediums. The computer-readable storage medium is non-transitory or non-volatile. In some embodiments, the non-transitory computer-readable storage medium in the memory 703 is configured to store at least one instruction, wherein the at least one instruction, when loaded and executed by the processor 701, causes the transceiver 702 to perform the data transmission method as described above.

It should be understood by those skilled in the art that, the structure shown in FIG. 7 does not constitute a limitation to the TOCN 700, and in practice, the TCON 700 includes more or fewer components than the drawings, or a combination of certain components, or different arrangements of the components.

Some embodiments of the present disclosure further provide a non-transitory computer-readable storage medium storing one or more instructions. The one or more instructions, when loaded and executed by the TCON, cause the TCON to perform the data transmission method as described above.

Some embodiments of the present disclosure further provide a computer program product storing one or more instructions. The one or more instructions, when loaded and run by a computer, cause the computer to perform the data transmission method as described above.

It should be noted that the information (including but not limited to user device information, user personal information, etc.), data (including but not limited to data for analysis, storage data, displayed data, etc.), and signals involved in the embodiments of the present disclosure are authorized by the user or sufficiently authorized by all parties, and the collection, use, and processing of the relevant data needs to comply with relevant laws, regulations, and standards of the relevant countries and regions. For example, the display data and the like involved in the embodiments of the present disclosure are acquired with sufficient authorization.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A data transmission method, applicable to a timing controller, the method comprising:

sending clock calibration data to a source driver chip, wherein the dock calibration data instructs the source driver chip to perform dock calibration;

sending, in response to completing the clock calibration by the source driver chip, first configuration information to the source driver chip over a data channel, wherein the first configuration information instructs the source driver chip to perform a configuration on a physical layer parameter; and after the source driver chip has performed the configuration on the physical layer parameter based on the first configuration information, sending a link stable pattern and then sending display data to the source driver chip.

2. The method according to claim 1, wherein the first configuration information comprises at least one of drive current configuration information, equalizer gain configuration information, and dock data recovery loop bandwidth configuration information of the source driver chip.

3. The method according to claim 1, after successively sending the link stable pattern and the display data to the source driver chip, further comprising:

re-sending, in response to a lock loss of the source driver chip, the dock calibration data to the source driver chip; and sending, in response to completing the clock calibration by the source driver chip, second configuration information to the source driver chip over the data channel, wherein the second configuration information instructs the source driver chip to re-perform the configuration on the physical layer parameter.

4. The method according to claim 1, wherein the display data comprises any row of pixel data in a frame of data, the row of pixel data corresponding to a row control instruction; and wherein the row control instruction comprises first power indication information, the first power indication information indicating whether the timing controller and the source driver chip enter a low-power mode in a horizontal blank period.

5. The method according to claim 2, wherein the display data comprises any row of pixel data in a frame of data, the row of pixel data corresponding to a row control instruction; and wherein the row control instruction comprises first power indication information, the first power indication information indicating whether the timing controller and the source driver chip enter a low-power mode in a horizontal blank period.

6. The method according to claim 3, wherein the display data comprises any row of pixel data in a frame of data, the row of pixel data corresponding to a row control instruction; and wherein the row control instruction comprises first power indication information, the first power indication information indicating whether the timing controller and the source driver chip enter a low-power mode in a horizontal blank period.

7. The method according to claim 1, wherein the display data comprises a last row of pixel data in a frame of data, the last row of pixel data corresponding to a frame control instruction; and wherein the frame control instruction comprises second power indication information, the second power indication information indicating whether the timing controller and the source driver chip enter a low-power mode in a vertical blank period.

8. The method according to claim 2, wherein the display data comprises a last row of pixel data in a frame of data, the last row of pixel data corresponding to a frame control instruction; and wherein the frame control instruction comprises second power indication information, the second power indication information indicating whether the timing controller and the source driver chip enter a low-power mode in a vertical blank period.

9. The method according to claim 3, wherein the display data comprises a last row of pixel data in a frame of data, the last row of pixel data corresponding to a frame control instruction; and wherein the frame control instruction comprises second power indication information, the second power indication information indicating whether the timing controller and the source driver chip enter a low-power mode in a vertical blank period.

10. The method according to claim 1, wherein there are a plurality of data channels;

wherein sending the first configuration information to the source driver chip over the data channel comprises;

sending the first configuration information to the source driver chip over each of the plurality of data channels, wherein the first configuration information sent over each data channel instructs the source driver chip to perform the configuration on the physical layer parameter corresponding to the data channel.

11. The method according to claim 10, wherein the first configuration information is different over at least two of the plurality of data channels.

12. A timing controller, comprising a processor, a transceiver, and a memory;

wherein the memory stores one or more instructions executable by the processor; and the processor, when loading and running the one or more instructions, is caused to control the transceiver to perform:

sending clock calibration data to a source driver chip, wherein the clock calibration data instructs the source driver chip to perform clock calibration;

sending, in response to completing the clock calibration by the source driver chip, first configuration information to the source driver chip over a data channel, wherein the first configuration information instructs the source driver chip to perform a configuration on a physical layer parameter; and after the source driver chip has performed the configuration on the physical layer parameter based on the first configuration information, sending a link stable pattern and then sending display data to the source driver chip.

13. The timing controller according to claim 12, wherein the first configuration information comprises at least one of drive current configuration information, equalizer gain configuration information, and clock data recovery loop bandwidth configuration information of the source driver chip.

14. The timing controller according to claim 12, wherein the processor, when loading and running the one or more instructions, is caused to control the transceiver to perform:

re-sending, in response to a lock loss of the source driver chip, the clock calibration data to the source driver chip; and sending, in response to completing the clock calibration by the source driver chip, second configuration information to the source driver chip over the data channel, wherein the second configuration information instructs the source driver chip to re-perform the configuration on the physical layer parameter.

15. The timing controller according to claim 12, wherein the display data comprises any row of pixel data in a frame of data, the row of pixel data corresponding to a row control instruction; and wherein the row control instruction comprises first power indication information, the first power indication information indicating whether the timing controller and the source driver chip enter a low-power mode in a horizontal blank period.

16. The timing controller according to claim 12, wherein the display data comprises a last row of pixel data in a frame of data, the last row of pixel data corresponding to a frame control instruction; and wherein the frame control instruction comprises second power indication information, the second power indication information indicating whether the timing controller and the source driver chip enter a low-power mode in a vertical blank period.

17. The timing controller according to claim 12, wherein there are a plurality of data channels;

wherein the processor, when loading and running the one or more instructions, is caused to control the transceiver to perform:

sending the first configuration information to the source driver chip over each of the plurality of data channels, wherein the first configuration information sent over each data channel instructs the source driver chip to perform the configuration on the physical layer parameter corresponding to the data channel.

18. The timing controller according to claim 17, wherein the first configuration information is different over at least two of the plurality of data channels.

19. A non-transitory computer-readable storage medium, storing one or more computer programs, wherein the one or more computer programs, when loaded and executed by a computer, cause the computer to perform:

sending clock calibration data to a source driver chip, wherein the clock calibration data instructs the source driver chip to perform clock calibration;

sending, in response to completing the clock calibration by the source driver chip, first configuration information to the source driver chip over a data channel, wherein the first configuration information instructs the source driver chip to perform a configuration on a physical layer parameter; and after the source driver chip has performed the configuration on the physical layer parameter based on the first configuration information, sending a link stable pattern and then sending display data to the source driver chip.

20. The non-transitory computer-readable storage medium according to claim 19, wherein the first configuration information comprises at least one of drive current configuration information, equalizer gain configuration information, and clock data recovery loop bandwidth configuration information of the source driver chip.

* * * * *